(12) United States Patent
Ono

(10) Patent No.: US 8,059,337 B2
(45) Date of Patent: Nov. 15, 2011

(54) WAVE PLATE WITH BIREFRINGENT REGIONS AND ITS MANUFACTURING METHOD

(75) Inventor: Motoshi Ono, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/588,199

(22) Filed: Oct. 7, 2009

(65) Prior Publication Data

US 2010/0033817 A1    Feb. 11, 2010

Related U.S. Application Data

(63) Continuation of application No. PCT/JP2008/056895, filed on Apr. 7, 2008.

(30) Foreign Application Priority Data

Apr. 9, 2007   (JP) .................................. 2007-101982

(51) Int. Cl.
    *G02B 5/30*    (2006.01)
(52) U.S. Cl. .............................. 359/489.07; 359/489.06
(58) Field of Classification Search ................... None
    See application file for complete search history.

(56) References Cited

U.S. PATENT DOCUMENTS

| | | | | |
|---|---|---|---|---|
| 6,128,059 A | * | 10/2000 | Nishiguchi | 349/129 |
| 2002/0005925 A1 | * | 1/2002 | Arakawa | 349/117 |
| 2006/0044385 A1 | | 3/2006 | Wurm et al. | |
| 2006/0137399 A1 | | 6/2006 | Alan et al. | |

FOREIGN PATENT DOCUMENTS

| | | |
|---|---|---|
| EP | 1 686 412 A2 | 8/2006 |
| JP | 8-190094 | 7/1996 |
| JP | 8-278410 | 10/1996 |
| JP | 2001-91743 | 4/2001 |
| JP | 2007-86556 | 4/2007 |
| JP | 2007-212805 | 8/2007 |
| JP | 2007-238342 | 9/2007 |
| WO | WO-2004/013668 A2 | 2/2004 |

OTHER PUBLICATIONS

Communication (Supplementary EP Search Report) in EP Appln No: 08739998.6 dated Apr. 28, 2011.
Office Action issued Aug. 8, 2011, in corresponding Chinese Application, 3 pages, with English translation, 2 pages.

* cited by examiner

Primary Examiner — Arnel C Lavarias
(74) Attorney, Agent, or Firm — Foley & Lardner LLP

(57) ABSTRACT

A wave plate is disclosed which includes a glass plate having a thickness of at least 0.1 mm and at most 5 mm. The glass plate has a plurality of strip-shaped birefringent regions substantially in parallel with a surface of the glass plate. The axial directions of the strip-shaped birefringent regions are the same with one another, and substantially in parallel with the surface of the glass plate. The wave plate has a retardation value of from 80 to 450 nm as measured with incident light having a wavelength of 540 nm.

6 Claims, 5 Drawing Sheets

WAVE PLATE WITH BIREFRINGENT REGIONS AND ITS MANUFACTURING METHOD

TECHNICAL FIELD

The present invention relates to a wave plate and a process for producing such a wave plate.

BACKGROUND ART

For wave plates to be employed for various optical devices in order to control the phase or the polarization of light, quartz and mica, that are birefringent crystals, and uniaxially aligned polymers (such as liquid crystals), are widely employed. For example, in a case of employing quartz or mica, being a birefringent crystal, for a quarter wave plate for transforming linearly polarized light into circularly polarized light, the quarter wave plate is produced by cutting the crystal in parallel with the crystal axis and mirror-polishing it into a thickness producing a phase difference of a quarter wavelength. In a case of uniaxially aligned polymer, a wave plate is produced by carrying out an alignment treatment by application of an electric field or an external force of e.g. a drawing operation so as to produce a desired phase difference. Generally speaking, in a case of a polymer type wave plate, due to the wavelength dispersion of the polymer, the birefringence increases as the wavelength becomes shorter, and the birefringence decreases as the wavelength becomes longer. Accordingly, such a wave plate has a birefringence opposite to an ideal birefringence for a wave plate. In order to solve this problem, Patent Document 1 proposes a technique of employing a cellulose ester film which contains a compound having at least two aromatic rings and having such a molecular structure that the conformation of the two aromatic rings has no steric hindrance. Further, Patent Documents 2 and 3 disclose a technique of adding a liquid crystal to a polymer to suppress change of birefringence due to a temperature compensation effect that is a temperature-dependent change of retardation caused by a temperature-dependent change of refractive index anisotropy of a liquid crystal cell.
Patent Document 1: JP-A-2001-91743
Patent Document 2: JP-A-8-278410
Patent Document 3: JP-A-8-190094

DISCLOSURE OF THE INVENTION

Problems to be Solved by the Invention

However, quartz has a problem that its crystal growth is time consuming and costly, and mica is limited in the amount since it is a natural material. Accordingly, the material cost itself of each of these materials is extremely high. Further, subsequent steps such as cutting or polishing are required, which make these materials extremely expensive.

With respect to an aligned polymer type wave plate, there is a merit that it can be produced with low cost. However, since it is difficult to control an electric field or a drawing operation to uniaxially align the polymer, the phase difference distribution in such a wave plate is larger than that in the above crystal type materials, and such a wave plate is also inferior in the thermal, optical and chemical resistances.

The cellulose ester film employed in the invention described in Patent Document 1, has a high water-absorption property and the film undergoes hydrolysis, dimension change, alignment relax, etc. Accordingly, the phase difference and its wavelength-dependent dispersion cannot be maintained for a long period of time for practical use, and a wave plate employing such a film has a problem in the durability in terms of optical properties.

Further, in the inventions disclosed in Patent Documents 2 and 3, in order to obtain a wave plate having a durability in practical use, it is probable that a special polymer having an extremely high glass transition temperature is required. Further, in terms of the cost of the liquid crystal itself, there is such a problem that since the liquid crystal is generally expensive as compared with the polymer being the raw material of the wave plate, the wave plate becomes extremely expensive.

Thus, there is no wave plate of low cost and having a high durability and a wide band property at present. The present invention has been made considering the above circumstances, and it is an object of the present invention to provide a wave plate of low cost and having a high durability and a wide band property, which can be easily produced, and to provide its production process.

Means for Solving the Problem

The present invention provides a wave plate, which is a glass plate having a thickness of at least 0.1 mm and at most 5 mm, wherein the glass plate has a plurality of strip-shaped birefringent regions substantially in parallel with a surface of the glass plate, the axial directions of the strip-shaped birefringent regions are the same with one another, and substantially in parallel with the surface of the glass plate, and wherein the wave plate has a retardation value of from 80 to 450 nm as measured with incident light having a wavelength of 540 nm.

Further, the present invention provides the above wave plate, which has a retardation value of from 100 to 150 nm as measured with incident light having a wavelength of 486 nm, and a retardation value of from 130 to 200 nm as measured with incident light having a wavelength of 656 nm.

Further, the present invention provides the above wave plate, which has a retardation value of from 200 to 300 nm as measured with incident light having a wavelength of 486 nm, and the retardation value of from 260 to 400 nm as measured with incident light having a wavelength of 656 nm.

Further, the present invention provides the above wave plate, which has a transmittance of at most 20% for light having a wavelength of from 700 to 1,200 nm.

Further, the present invention provides the above wave plate, which has a transmittance of at most 10% for light having a wavelength of at most 400 nm.

Further, the present invention provides an optical low-pass filter provided with the above wave plate.

Further, the present invention provides a process for producing a wave plate, comprising irradiating a glass plate with a laser beam condensed by a lens or a concave mirror so as to be focused in the glass plate or on a surface thereof, scanning the glass plate or the laser beam in this state to form a tensile stress distribution along the scanning direction, and thereby inducing a uniaxial birefringence.

Further, the present invention provides the above process for producing a wave plate, wherein the scanning of the laser beam is linear and parallel with the surface of the glass plate.

Further, the present invention provides the above process for producing a wave plate, wherein the scanning of the laser beam is repeated a plurality of times without changing the depth position of the focal point from the surface of the glass plate.

Further, the present invention provides the above process for producing a wave plate, wherein for the scanning of the laser beam, there are a plurality of the depth positions of the focal point from the surface of the glass plate.

Further, the present invention provides the above process for producing a wave plate, wherein the glass plate is irradiated with a plurality of beams split from the laser beam by a beam splitting element.

Further, the present invention provides the above process for producing a wave plate, wherein the laser beam has a wavelength of from 190 to 1,100 nm, a pulse width of at least 1 ns and at most 10 ms and a repetition rate of f, and provided that the irradiation fluence to the glass plate is F (J/cm$^2$), the condensed laser beam diameter is d (cm) and the scanning speed is s (cm/s), then, a value F·d·f/s being a product of the irradiation influence F and the number of laser irradiations in the condensed laser beam diameter d·f/s, is at most 76,000 J/cm$^2$.

Further, the present invention provides the above process for producing a wave plate, wherein the laser beam is a continuous wave $CO_2$ laser beam, and provided that the irradiation power density to the glass plate is PD (W/cm$^2$), the condensed laser beam diameter is d (cm) and the scanning speed is s (cm/s), then, a value PD·d/s being a product of the irradiation power density PD and the condensed laser beam passing time d/s, is from 120 to 200 J/cm$^2$.

Effects of the Invention

The present invention realizes a wave plate of low cost, and having a high durability and a wide band property, and a process for producing such a wave plate. Further, it becomes possible to combine a wave plate function to a glass component having other optical functions, which contributes to reduce the number of optical components or to reduce the size.

EXPLANATION OF NUMERALS

Figure 1:
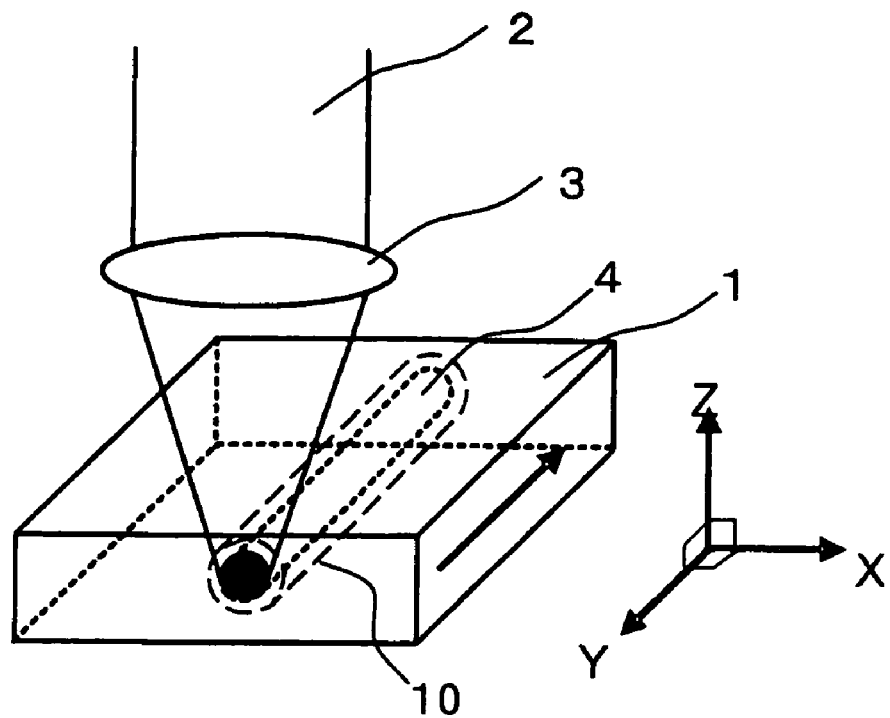
FIG. 1 is a conceptual view showing an example of the process for producing a wave plate of the present invention.

1: Glass plate
2: Laser beam
3: Lens
4: Laser beam scanning region
5: Beam splitting element
10: Birefringent region around laser beam scanning region
11: Cylindrical lens
12: Line shaped beam

BEST MODE FOR CARRYING OUT THE INVENTION

The wave plate of the present invention is made of a glass plate having a thickness of at least 0.1 mm and at most 5 mm. If the thickness of the glass plate exceeds 5 mm, downsizing of an optical component may not be achieved, and the thickness of at most 2 mm is preferred in terms of downsizing of the optical component. If the thickness is less than 0.1 mm, the strength of the phase plate may be insufficient. For the purpose of maintaining the strength, the thickness of the glass plate is preferably at least 0.3 mm.

The present invention provides a wave plate having a retardation value of from 80 to 450 nm, preferably from 134 to 271 nm as measured with incident light having a wavelength of 540 nm. When the retardation value as measured with incident light having a wavelength of 540 nm, is from 80 to 450 nm, it becomes possible to constitute a wave plate producing various phase differences for light incident into a solid state image-capturing device such as a CCD, or for light from a light source of a liquid crystal projector or a pickup element for CD or DVD.

Further, when the wave plate has a retardation value of from 100 to 150 nm as measured with incident light having a wavelength of 486 nm and a retardation value of from 130 to 200 nm as measured with incident light having a wavelength of 656 nm, the wave plate has a function of quarter wave plate in the entire visible light region, and it can be used as a quarter wave plate for a solid state image-capturing device such as a CCD or optical components required for a liquid crystal projector or a pickup element for CD or DVD.

An ideal quarter wave plate has a retardation value of 121.5 nm as measured with incident light having a wavelength of 486 nm, and a retardation value of 164 nm as measured with incident light having a wavelength of 656 nm. However, since a general material has a normal dispersion wherein the refractive index increases as the wavelength becomes shorter, and as a result, the retardation value increases as the wavelength becomes shorter. In a case of glass, differently from a case of using a conventional organic material such as a polymer, the wavelength-dependent dispersion of refractive index is relatively small. Accordingly, in a case of using a glass, it becomes possible to achieve a retardation value within a range of from 100 to 150 nm as measured with incident light having a wavelength of 486 nm, and to achieve a retardation value within a range of from 130 to 200 nm as measured with incident light having a wavelength of 656 nm. Accordingly, in the case of using a glass, as compared with a case of using an organic material such as a polymer, a desired retardation value can be obtained in a wider wavelength band. When the retardation value is within this range, the wave plate has a sufficient function required for a quarter wave plate to be employed for e.g. a CCD in the entire visible band.

Further, when the wave plate has a retardation value of from 200 to 300 nm as measured with incident light having a wavelength of 486 nm, and a retardation value of from 260 to 400 nm as measured with incident light having a wavelength of 656 nm, the wave plate has a sufficient function required for a quarter wave plate, and it can be used as a quarter wave plate for optical components essential for a liquid crystal projector or a pickup element for CD or DVD.

Further, the wave plate of the present invention can have a near-infrared-cutting filter function whereby the light transmittance is at most 20%, preferably at most 10% in a wavelength region of from 700 to 1,200 nm. By employing a wave plate having such a wavelength characteristic, it is possible to eliminate near infrared rays from light incident into a solid state image-capturing device such as a CCD, which causes deterioration of image quality such as color tone. When the wave plate has such a near-infrared-cutting filter function, it is possible to reduce the number of components of an optical low-pass filter and to reduce the cost.

The near-infrared-cutting filter function whereby the transmittance of light having a wavelength of from 700 to 1,200 nm is at most 20%, can be obtained by either forming a metallic film reflecting infrared rays having such a wavelength, or by intermixing metallic ions absorbing such near-infrared rays in a glass.

As the composition of the metallic film reflecting near-infrared rays, e.g. silver can be employed. The method for forming the metal film is not particularly limited, and it may be a dry coating method such as a physical vapor deposition method or a chemical vapor deposition method. Here, the physical vapor deposition (PVD) method may, for example, be a vapor deposition method (vacuum vapor deposition method, electron beam vapor deposition method, ion beam vapor deposition method), an ion plating method or a sputtering method. As the sputtering method, a DC sputtering method, an RF sputtering method, a magnetron sputtering method, an ECR sputtering method or an ion beam sputtering method (laser abrasion method) may, for example, be mentioned. Further, the chemical vapor deposition (CVD) method may, for example, be a thermal CVD, a plasma CVD or a photo CVD.

Among these, the metallic film is preferably formed by a vapor deposition method. Further, a sputtering method and an ion plating method are preferred for the reason that these methods can control the film thickness with high accuracy.

As the metallic ions contained in the glass and absorbing near-infrared rays, copper ions or iron ions may be used. The type of the glass to be employed is not particularly limited, and it may, for example, be a soda lime glass, a borosilicate glass or a fluorophosphate glass. Such a glass containing metallic ions absorbing near-infrared rays may, for example, be a soda lime glass containing iron ions or a fluorophosphate glass containing copper ions.

By scanning a laser beam on a glass plate having such a composition, a wave plate integrated with the above function of cutting near-infrared rays can be produced.

Further, the wave plate of the present invention preferably has a UV-cutting filter function whereby the transmittance is at most 10%, preferably at most 5% for light having a wavelength of at most 400 nm, for the purpose of preventing degradation of image quality such as color tone. Such a UV-cutting filter may, for example, be one wherein a dielectric multilayer film is formed on a glass surface.

Now, embodiments of the present invention will be described in detail with reference to drawings.

FIG. 1 is a conceptual view showing an example of the process for producing a wave plate of the present invention. A laser beam 2 that can be focused in a glass plate 1, is condensed by a lens 3 and is incident into the glass plate 1, and while the depth position of the focal point is maintained constant, the glass plate 1 is linearly scanned in Y direction backwardly from the front side. As a result, in a strip-shaped portion 4 in the glass plate 1, which is linearly irradiated with the laser beam 2, a tensile stress is formed in the same direction as the scanning direction, and a strip-shaped birefringent region having a principal axis (anisotropy axis) is formed so as to include inside the laser irradiation region 4 and a region 10 around the laser irradiation region 4.

In the embodiment of the present invention, the glass plate 1 may be scanned as described above, but on the contrary, the laser beam 2 may be linearly scanned while the glass plate 1 is fixed.

Figure 2:
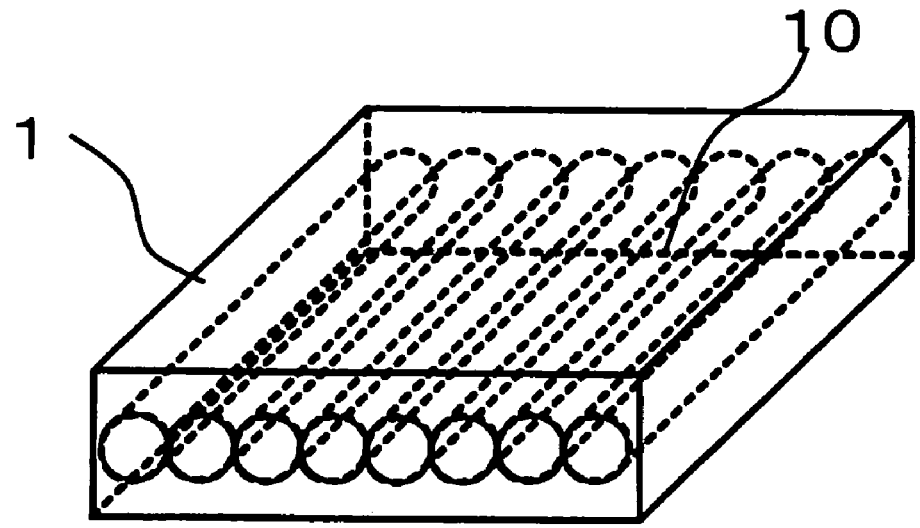
FIG. 2 is a conceptual view showing an example of the wave plate of the present invention.

FIG. 2 is a conceptual view showing an embodiment of the wave plate having a plurality of strip-shaped birefringent regions at a position substantially in parallel with a surface of the glass plate 1. In the process for producing a wave plate shown in FIG. 1, after the glass plate 1 is linearly scanned in Y direction, the glass plate 1 is moved a distance whereby the birefringent region 10 formed by the irradiation of laser beam does not overlap a birefringent region 10 formed by next irradiation of laser beam. Thereafter, the glass plate 1 is linearly scanned in Y direction. By repeating this operation a plurality of times, a wave plate is obtained, which has a plurality of strip-shaped birefringent regions at a position substantially in parallel with the surface of the glass plate 1.

Figure 3:
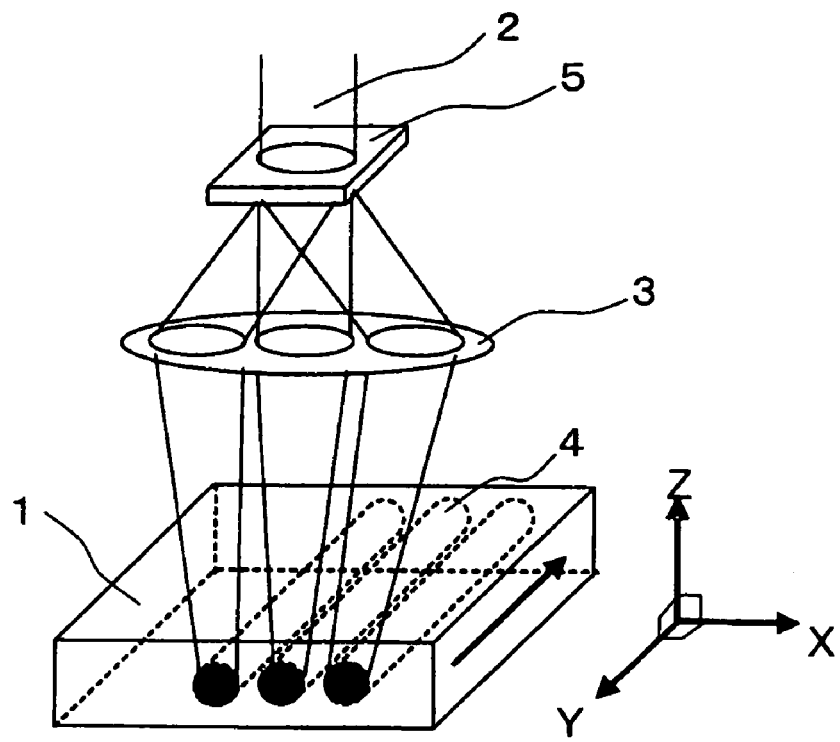
FIG. 3 is a conceptual view showing another example of the process for producing a wave plate of the present invention.

FIG. 3 is a conceptual view showing an example of the process for producing a wave plate having a large area by one step by using a plurality of beams split from the laser beam 2 by a beam splitting element 5. In FIG. 3, the laser beam 2 is split into three laser beams by the beam splitting element 5, they are each condensed and irradiated by a lens 3, and while the depth position of their focal points are fixed, the glass plate is linearly scanned in Y direction backwardly from the front side in the same manner as FIG. 1. Accordingly, it is possible to form three strip-shaped portions 4 inside the glass plate 1 simultaneously, which are each irradiated linearly with laser beams. As a result, a tensile stress is formed in the same direction as the scanning direction of the glass plate 1 or the laser beam, and three-strip shaped birefringent region each having a principal axis (anisotropic axis) are formed simultaneously so as to each includes the inside and around the laser irradiation region 4. The construction of the wave plate obtainable by the process for producing a wave plate shown in FIG. 3, is basically the same as that of FIG. 2.

Figure 4:
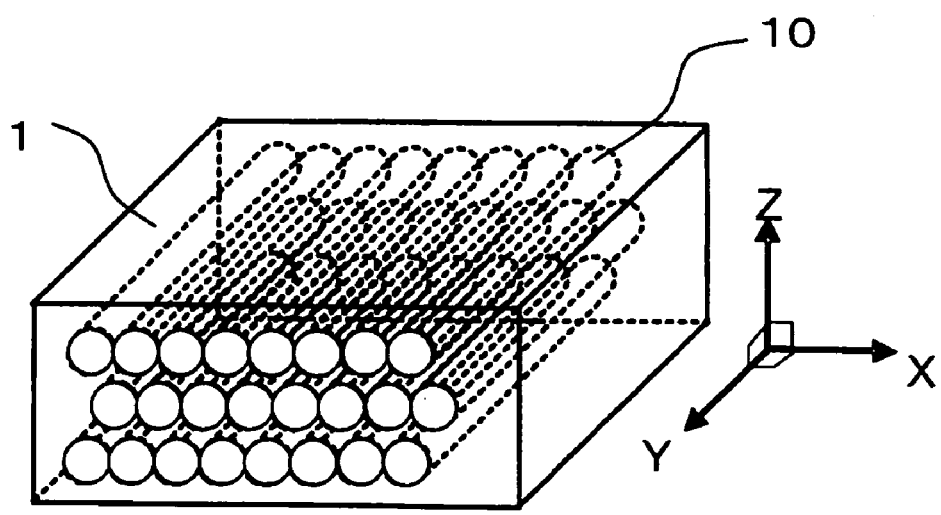
FIG. 4 is a conceptual view showing another example of the wave plate of the present invention.

FIG. 4 is a schematic view showing an example of the process for producing a wave plate in a case of producing a wave plate having a larger retardation in the thickness direction (Z direction) of the glass plate 1. By forming a plurality of birefringent regions into layers in the thickness direction of the glass plate 1, the retardation value is increased.

This embodiment can be easily achieved in the production process shown in FIGS. 1 to 3 by either changing the depth position of the focal point of the laser beam 2 and linearly scanning the glass plate 1 in Y direction backwardly from the front side or linearly scanning the laser beam while the glass plate 1 is fixed. In this case, it is preferred to form the birefringent regions in a deeper layer in the glass plate 1 first, from the viewpoint of the aberration of condensed beam. Further, the plurality of strip-shaped birefringent induction regions preferably do not overlap in the thickness direction of the glass plate as shown in FIG. 4. If the birefringent induction regions overlap in the thickness direction of the glass plate, the total birefringent amount shows a strip-shaped distribution, and is not uniform. So long as the retardation is a desired value for the wave plate, the plurality of birefringent induction regions formed in layers may be continuous in the thickness direction of the glass plate, or these birefringent regions may be discontinuous in the thickness direction of the glass plate.

Figure 6:
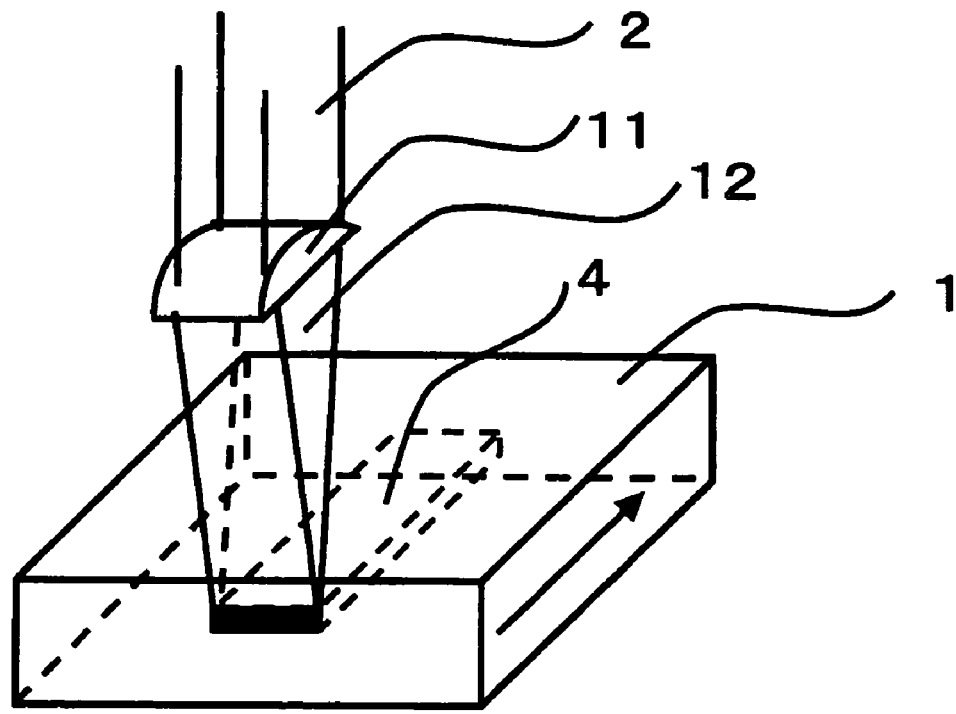
FIG. 6 is a conceptual view showing another example of the process for producing a wave plate of the present invention.

FIG. 6 is a conceptual view showing another example of the process for producing a wave plate of the present invention. A laser beam 2 that can be focused inside the glass plate 1 is condensed by a cylindrical lens 11 to form a line beam 12 in the glass. While the depth position of the line beam is fixed, the glass plate 1 is linearly scanned in a direction perpendicular to the longitudinal direction of the line beam 12. As a result, in a plate-shaped portion 4 in the glass plate 1, wherein the laser beam 2 is linearly scanned, a tensile stress is formed in the same direction as the scanning direction and a plate-shaped birefringent region having a principal axis (anisotropic axis), is formed.

By using such a cylindrical lens and scanning the laser beam with a high output at a high scanning speed, it is possible to obtain a birefringent region showing a high retardation by one scanning, whereby a wave plate such as a quarter wave plate can be produced efficiently.

Further, when a laser beam showing an extremely high absorption into a glass such as a $CO_2$ laser beam, is incident into the glass plate, the laser beam is absorbed into a surface of the glass plate and a retardation occurs on the surface of the glass plate. A retardation higher than a retardation obtainable by irradiation of the $CO_2$ laser beam from one surface of the glass plate, can be obtained by further irradiating a $CO_2$ laser from a surface opposite to the above surface of the glass plate.

By cooling the glass during and after the irradiation, the tensile stress is increased and an induced birefringence is increased, whereby a wave plate having a large phase difference can be produced. The method for the cooling may, for example, be a method of cooling a cooling air or a glass holder itself by e.g. a Peltier device.

For the glass plate to be used in the present invention, a soda lime glass, a borosilicate glass or a silica glass may be employed, but in order to increase the absorption coefficient at a laser wavelength to be used, the glass may be doped with a small amount of transition metal. Further, the glass itself may be a glass having a specific function such as a near-infrared-cutting function.

The laser to be used in the present invention may be a laser capable of focusing inside the glass plate and a laser having high absorption coefficient in the glass.

In a case of using a laser capable of focusing inside the glass plate, it is necessary that the laser beam has a wavelength of from 190 to 1,100 nm, a pulse width of at least 1 ns and at most 10 ms and a repetition rate of f, and provided that the irradiation fluence on the glass plate is F ($J/cm^2$), the condensed laser beam diameter is d (cm) and the scanning speed is s (cm/s), then, a value $F \cdot d \cdot f/s$ being a product of the irradiation fluence F and the number of laser irradiations in the condensed laser beam diameter $d \cdot f/s$, is at most 76,000 $J/cm^2$, preferably at most 50,000 $J/cm^2$. Here, the irradiation fluence is an irradiation energy of one pulse per a unit area, that is obtainable by dividing the average output per unit area by the repetition rate. Further, the number of laser irradiations in the condensed laser beam diameter $d \cdot f/s$ shows the number of pulses irradiated while the laser moves in a distance corresponding to the condensed beam diameter. By multiplying this value by the above irradiation fluence, it is possible to obtain a total energy irradiated on a unit area of the condensed laser portion when the laser beam irradiation with scanning is carried out.

If the wavelength is shorter than 190 nm, absorption into optical components is high, and a special laser irradiation optical system becomes required, such being not preferred. If the wavelength exceeds 1,100 nm, no high power short pulse laser is present, For this reason, a laser having a wavelength of from 190 to 1,100 nm is employed. If the pulse width is less than 1 ns, laser irradiation ends before thermal diffusion of irradiation energy occurs, and accordingly, a thermal processing is difficult and a stress forming is difficult, whereby it is difficult to use such a laser. On the other hand, if the pulse width is 10 ms or more, the peak power of a pulse becomes low, and it is not possible to add a sufficient thermal energy to the glass, and thermal processing is difficult. If the product of the irradiation fluence F and the number $d \cdot f/s$ of irradiations in the irradiation diameter exceeds 76,000 $J/cm^2$, a crack may be formed, and it is difficult to use such a laser beam. If the product of the irradiation fluence F and the number $d \cdot f/s$ of irradiations in the irradiation diameter is too small, it is difficult to form a birefringent region. Accordingly, the product of the irradiation fluence F and the number $d \cdot f/s$ of irradiation in the irradiation diameter is preferably at least 2,000 $J/cm^2$, particularly preferably at least 5,000 $J/cm^2$.

As the above laser capable of focusing inside the glass plate, an excimer laser (KrF: wavelength 248 nm, ArF: wavelength 193 nm) is preferred, but a fundamental wave of YAG laser (wavelength 1,064 nm), a second harmonic wave of YAG laser (wavelength 532 nm), a third harmonic wave of YAG laser (wavelength 355 nm), a titanium sapphire laser (wavelength 800 nm), etc. having a wavelength at which the glass has a low absorption coefficient, can also be sufficiently usable. The above lasers are preferably ones of pulse-oscillation type since they have high peak powers, but ones of continuous oscillation (CW) type are also usable.

Further, a $CO_2$ laser (wavelength 10.6 μm) having a wavelength at which the glass has a high absorption coefficient, is also usable. Provided that the irradiation power density of the $CO_2$ laser beam to the glass plate is PD ($W/cm^2$), the condensed laser diameter is d (cm) and the scanning speed is s (cm/s), the product of the irradiation power density PD and the condensed laser beam diameter passing time d/s, is at most 200 $J/cm^2$, preferably at most 190 $J/cm^2$. If it exceeds 200 $J/cm^2$, e.g. a crack forms in the glass plate.

Figure 5:
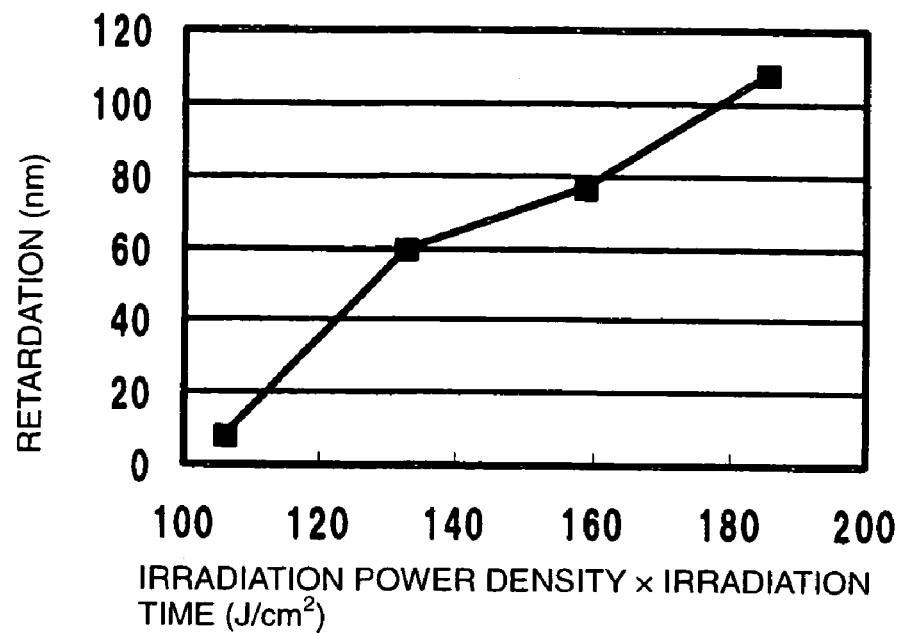
FIG. 5 is a view showing the relation between "irradiation power density×irradiation diameter passing time" and the retardation in Examples 2 and 3.

In the case of $CO_2$ laser, since the laser beam shows a high absorption into a glass, the birefringent region is limited to a surface of the glass. Accordingly, forming of the layers of the birefringent-forming regions shown in FIG. 4, can be achieved in only two layers along one surface and the other surface. Accordingly, in order to obtain a retardation of 80 nm by two layers along a surface and the other surface of the glass plate, it is necessary for each layer to produce a retardation of 40 nm. To achieve this, according to FIG. 5 showing the relation between "the irradiation power density×irradiation diameter passing time" and the retardation, the product of the irradiation power density PD and the condensed laser beam diameter passing time d/s, needs to be at least 120 $J/cm^2$. Here, the irradiation power density is an irradiation power per a unit area, which is a value obtained by dividing the average power divided by the irradiation area. Further, the condensed laser beam diameter passing time d/s shows a time for the laser beam to move in a distance corresponding to the condensed beam diameter, and by multiplying this value by the above irradiation power, the total irradiation energy per a unit area in the condensed laser beam portion at a time of irradiation with scanning, can be obtained.

The optical low-pass filter of the present invention is constituted by a wave plate, a birefringent plate and an infrared-cutting layer or a UV-cutting layer. The optical low-pass filter of the present invention has a function of transforming linearly polarized light into circularly polarized light by the wave plate, a function of separating an object image in the vertical and horizontal directions by the birefringent plate, a function of inhibiting a color moire or a function of inhibiting blushing by the infrared cutting layer, and the optical low-pass filter is adapted to be attached on a front side of an image-capturing device such as a CCD. An optical low-pass filter employing the wave plate of the present invention, can be produced by irradiating a glass plate with a laser beam so that the retardation value becomes a quarter wavelength, laminating an infrared-cutting layer or a UV-cutting filter on the glass plate, and further laminating a quartz birefringent plate on each side of the glass plate.

As an alternative, the optical low-pass filter can be produced by irradiating a glass plate containing copper ions or iron ions with a laser beam so that the retardation value becomes a quarter wavelength, and laminating a quartz birefringent plate on each side of the glass plate.

When the wave plate (quarter wave plate) is produced by the production method of the present invention, it is possible to integrate into a single plate, a quartz quarter wave plate, an infrared-cutting filter and an UV-cutting filter, that constitute a normal optical low-pass filter, whereby the thickness of the optical low-pass filter can be reduced, such being preferred.

EXAMPLES

Now, the present invention will be described in further detail with reference to Examples. Examples 1, 2, 4 and 5 are Examples of the present invention, and Example 3 is a Comparative Example. The present invention is by no means construed as limited to these Examples.

Example 1

A soda lime glass plate having a thickness of 1 mm was irradiated with a third harmonic wave (wavelength 355 nm, pulse width 25 ns) of a YAG laser that was condensed into about φ 1 μm, and the glass plate was linearly scanned at a scanning speed of 5 mm/s while the focal point of the laser was fixed at 200 μm inside from a surface of the glass plate, by using an objective lens of NA 0.42 as the condenser lens, to induce birefringence. Subsequently, while the focal point was fixed at a position 100 μm above the portion irradiated in the previous step, the glass plate was irradiated with the third harmonic wave of the YAG laser under the same conditions as described above. The YAG laser was AVIA-X manufactured by Coherent Inc., and it was used with an average output of 1 W and a repetition rate of 80 KHz. The retardation of the laser irradiation portion was measured with an incident light having a wavelength of 540 nm by using a birefringent meter (KOBRA-CCD) manufactured by Oji Scientific Instruments, and it was confirmed that a retardation of about 100 nm was induced in a region of about 100 μm wide along the laser irradiation portion. Further, by a cross-nicol observation, it was confirmed that the direction of its principal axis (anisotropic axis) was the same as the scanning direction of the glass plate.

Example 2

A surface of a soda lime glass plate having a thickness of 3 mm was irradiated with a $CO_2$ laser beam (wavelength 10.6 μm) in CW oscillation that was condensed into a spot of φ 300 μm by a lens having a focal length of 100 mm, and the glass plate was linearly scanned at a scanning speed of 8 mm/s to induce birefringence. The above irradiation was repeated with the average laser power increased from 2 W by 0.5 W each time, and the retardation of the irradiation portion was measured by a Senarmont method. As a result, the retardation value increased as the laser power increased, and when the irradiation was made with 3.5 W, the maximum retardation value 108 nm was obtained. FIG. 5 shows the relation between "the irradiation power density×the irradiation diameter passing time" and the retardation.

Further, after a front surface of a glass plate was irradiated with a laser beam with an average power of 3.5 W, a rear surface of the glass plate was also irradiated with a laser beam of 3.5 W so that the irradiation portion on the rear side overlaps the irradiation portion on the front side, and as a result, a retardation of 200 nm was obtained, which was twice the retardation at the time of single side irradiation. At this time, a value of "irradiation power density×irradiation diameter passing time" was 185.8 $J/cm^2$.

It is possible to control the principal axis or the retardation value of the induced birefringence by controlling the average power, the scanning speed and the scanning direction of the laser beam. As a result, it is possible to produce a wave plate having an optional retardation value in an optional direction. Thus, it is possible to impart a desired principal axis direction and a desired phase difference to a glass plate easily. Further, since the wave plate of the present invention can be produced by simply irradiating a glass with a laser beam, the wave plate is less expensive with higher durability than any other wave plates.

Example 3

When a glass plate was irradiated with a $CO_2$ laser beam in CW oscillation with an average output of at least 4 W in the same manner as Example 2, a crack was formed on the glass plate. The value of "the irradiation power density×irradiation diameter passing time at this time" was 212.3 $J/cm^2$.

Example 4

Figure 7:
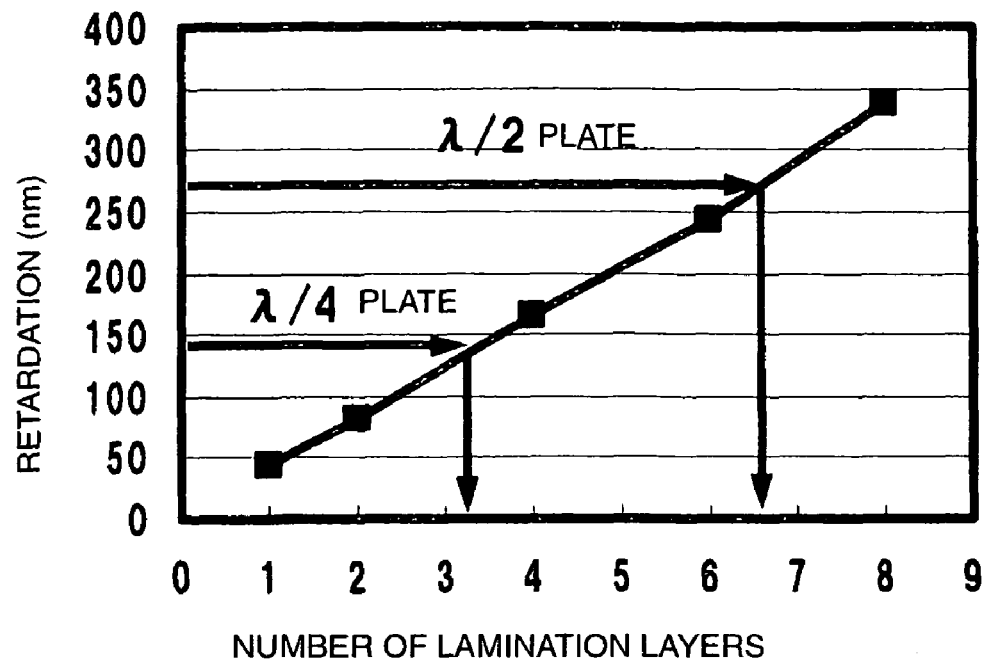
FIG. 7 is a view showing the relation between the number of laser irradiation layers and the retardation value of the present invention.

A soda lime glass having a thickness of 3 mm was irradiated with a third harmonic wave (wavelength 355 nm, pulse width 25 ns) of a pulsed YAG laser that was condensed by an objective lens of NA 0.42 so as to be focused inside the glass, and a linear scanning was made with a laser power of 2 W, a repetition rate of 80 KHz and a scanning speed of 10 mm/s, to induce a birefringence. A wave plate in which the laser beam irradiation portions were formed in layers at intervals of 100 μm in the thickness direction, was produced, and the relation between the number of the layers and the retardation was measured. As a result, it is understandable that the retardation value is linear to the number of the layers, and that the retardation value can be increased by increasing the number of the layers and a λ/2 plate can also be produced. FIG. 7 shows the relation between the number of the layers and the retardation value.

Figure 9:
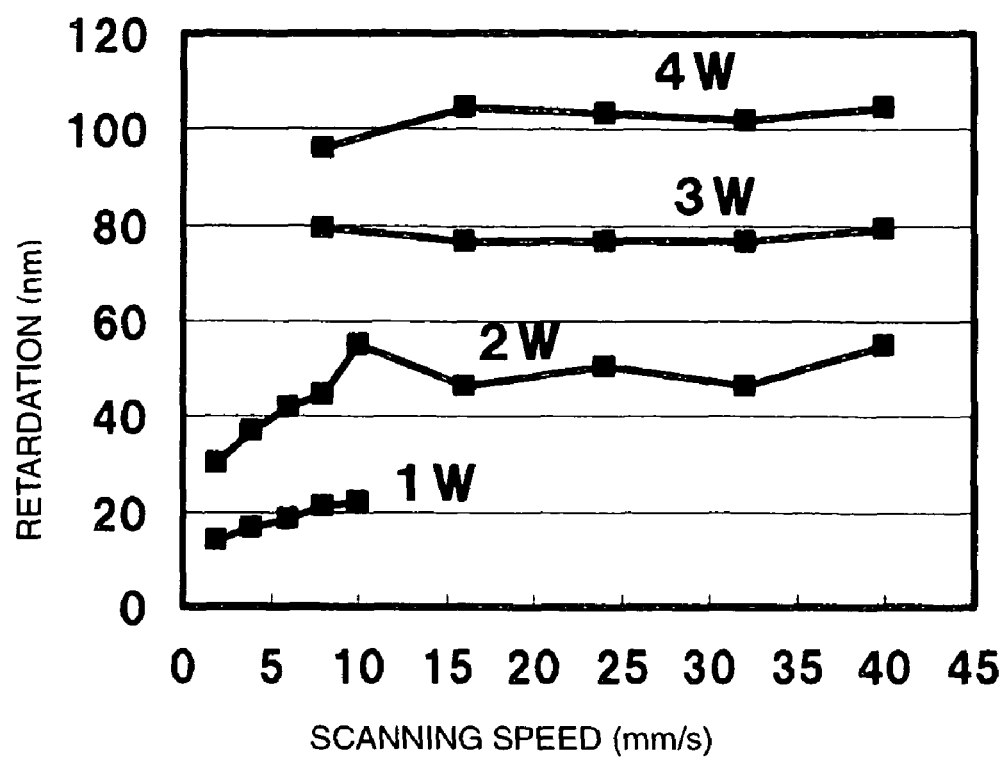
FIG. 9 is a view showing the relation between laser power, scanning speed and retardation value of the present invention.

In Example 1, since the birefringence was induced with a laser power of 1 W and a scanning speed of 5 mm/s, many times of scanning was required to produce a quarter wave plate having a retardation of about 100 nm. However, by using a condition that the laser output is 2 W and the scanning speed is 10 mm/s, it is possible to reduce the number of scans, and to produce the quarter wave plate and the half wave plate efficiently. FIG. 9 shows the nature of increase of the retardation value when the laser power and the scanning speed are increased. It is understandable from FIG. 9 that by increasing the laser power and the scanning speed, the retardation value can be increased easily, and for example, by condensing a laser beam having a power of 4 W and scanning at 40 mm/s, a retardation of about at least 100 nm can be induced by a single layer (single scanning), and a quarter wave plate can be produced by a single layer.

Example 5

Figure 8:
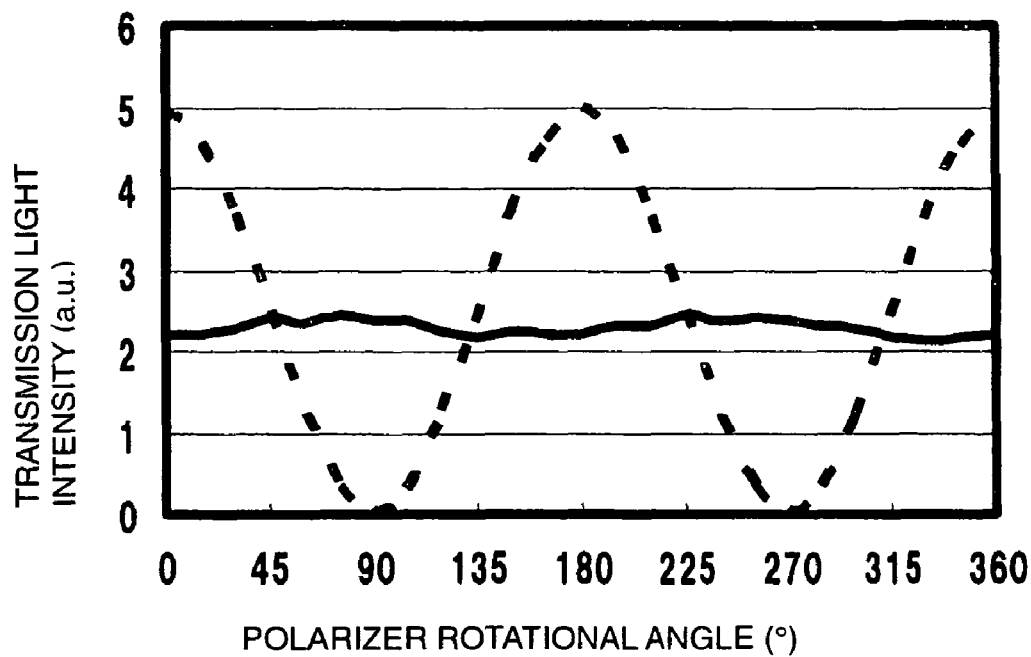
FIG. 8 is a view showing a polarization conversion function in Example 5 of the present invention.

A soda lime glass having a thickness of 3 mm was irradiated with a third harmonic wave (wavelength 355 nm, pulse width 25 nm) of a pulsed YAG laser that was condensed by an objective lens of NA 0.42 so as to be focused inside the glass, and linear scanning was carried out with a laser power of 2 W, a repetition rate of 80 KHz and a scanning speed of 10 mm/s, to induce a birefringence. The scanning of the laser beam for 3 mm long was repeated 100 times at horizontal intervals of 40 μm at each depth position, and this series of scanning was carried out at 4 depth positions at intervals of 100 μm in the depth direction. As a result, a uniform retardation of 116 nm was induced in an area of 3 mm×3 mm. Into the wave plate thus produced, linearly polarized light beams polarized in the same direction and in a direction 45° to the principal axis of the wave plate were incident, the transmission light intensity was monitored by positioning a polarizer at the output portion and rotating the polarizer. FIG. 8 shows the results.

The broken line shows a case where a polarized light beam polarized in the same direction as the principal axis direction of the wave plate was incident, and the solid line shows a case where a polarized light beam polarized in a direction at 45° to the principal axis direction of the wave plate was incident. In the case of 45° angle, the transmission light intensity was substantially constant without depending on the rotational angle of the polarizer as shown in FIG. 8, which indicates that the wave plate has a function of quarter wave plate, and linearly polarized light was transformed into circularly polarized light.

INDUSTRIAL APPLICABILITY

The present invention can be used not only as a wave plate but also a phase mask, a polarization conversion element to be used for a liquid crystal projector, an optical low-pass filter to be used for a solid state image-capturing device, or an optical component such as an optical pickup element or an isolator.

The entire disclosure of Japanese Patent Application No. 2007-101982 filed on Apr. 9, 2007 including specification, claims, drawings and summary is incorporated herein by reference in its entirety.

What is claimed is:

1. A wave plate, comprising:
   a glass plate having a thickness of at least 0.1 mm and at most 5 mm, wherein the glass plate comprises a plurality of strip-shaped birefringent regions formed in the glass plate substantially in parallel with a surface of the glass plate,
   wherein each of the strip-shaped birefringent regions extends along a common axial direction substantially in parallel with the surface of the glass plate, and
   wherein the wave plate has a retardation value of from 80 to 450 nm as measured with incident light having a wavelength of 540 nm.

2. The wave plate according to claim 1, which has a retardation value of from 100 to 150 nm as measured with incident light having a wavelength of 486 nm, and a retardation value of from 130 to 200 nm as measured with incident light having a wavelength of 656 nm.

3. The wave plate according to claim 1, which has a retardation value of from 200 to 300 nm as measured with incident light having a wavelength of 486 nm, and a retardation value of from 260 to 400 nm as measured with incident light having a wavelength of 656 nm.

4. The wave plate according to claim 1, which has a transmittance of at most 20% for light having a wavelength of from 700 to 1,200 nm.

5. The wave plate according to claim 1, which has a transmittance of at most 10% for light having a wavelength of at most 400 nm.

6. An optical low-pass filter provided with the wave plate as defined in claim 1.

* * * * *